(12) United States Patent
Cullen

(10) Patent No.: US 8,707,615 B2
(45) Date of Patent: Apr. 29, 2014

(54) MODULAR BED BUG TRAP SYSTEM

(71) Applicant: Robert Joseph Cullen, Toronto (CA)

(72) Inventor: Robert Joseph Cullen, Toronto (CA)

( * ) Notice: Subject to any disclaimer, the term of this patent is extended or adjusted under 35 U.S.C. 154(b) by 0 days.

(21) Appl. No.: 13/918,154

(22) Filed: Jun. 14, 2013

(65) Prior Publication Data

US 2014/0020280 A1    Jan. 23, 2014

(30) Foreign Application Priority Data

Jul. 18, 2012 (CA) ..................................... 2783685

(51) Int. Cl.
*A01M 1/20* (2006.01)
(52) U.S. Cl.
USPC .................. 43/123; 43/121; 43/107
(58) Field of Classification Search
USPC ........... 43/107, 109, 114, 121, 123, 124, 131, 43/132.1
See application file for complete search history.

(56) References Cited

U.S. PATENT DOCUMENTS

| | | | |
|---|---|---|---|
| 1,005,567 A | 10/1911 | McDonald | |
| 2,054,730 A | 9/1936 | Pierpoint | |
| 4,263,740 A | 4/1981 | Hemsarth | |
| 5,170,584 A * | 12/1992 | Perry | 43/124 |
| 5,502,919 A * | 4/1996 | Ciarletta | 43/131 |
| 5,768,821 A | 6/1998 | Currey | |
| 5,926,999 A | 7/1999 | Vernon | |
| 7,676,985 B1 | 3/2010 | Perkins | |
| 8,020,341 B2 | 9/2011 | Ramos-Santiago | |
| 2005/0138858 A1 | 6/2005 | Lyng | |
| 2006/0265942 A1 * | 11/2006 | Watson | 43/114 |
| 2009/0145020 A1 | 6/2009 | McKnight | |
| 2010/0043275 A1 | 2/2010 | Battick | |
| 2011/0047860 A1 | 3/2011 | Black | |
| 2011/0225873 A1 | 9/2011 | McKnight | |
| 2011/0289822 A1 | 12/2011 | Duehl | |
| 2012/0291336 A1 * | 11/2012 | Friend | 43/114 |

FOREIGN PATENT DOCUMENTS

WO    2011/127529 A1    10/2011

* cited by examiner

*Primary Examiner* — Peter M Poon
*Assistant Examiner* — Timothy Schwarz

(57) ABSTRACT

A segmented, floor-based trap system, which may be configured to delineate a floor area of arbitrary rectilinear geometry that is infested with crawling arthropods, particularly bed bugs, or an area to be protected from such infestation, thereby to intercept egress of such insects from such an area, or their ingress into it.
The trap system comprises a plurality of trough-like linear segments containing a layer of mechanical insecticide, such as diatomaceous earth, and serving as an insect pitfall, and a plurality of linear and right-angled connectors, by which the linear segments may be connected continuously in fluid communication. A roughened, obtusely inclined flange extends from the top of each of the side walls of each linear segment to the floor, serving as a ramp leading insects to the smooth-walled pitfall. Foreshortened linear segments fitted to corner connectors in concave corners of the trap assembly preserve rectilinear alignment.

9 Claims, 4 Drawing Sheets

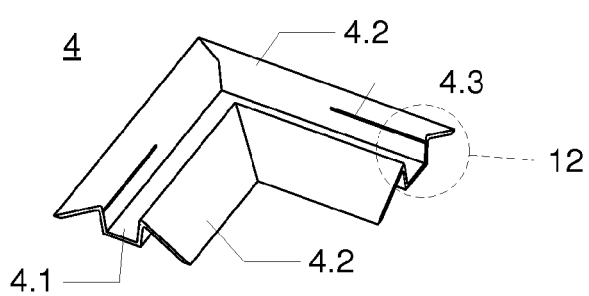
Fig. 11
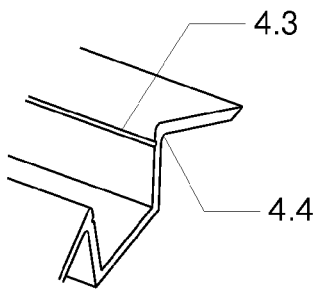
Fig. 12
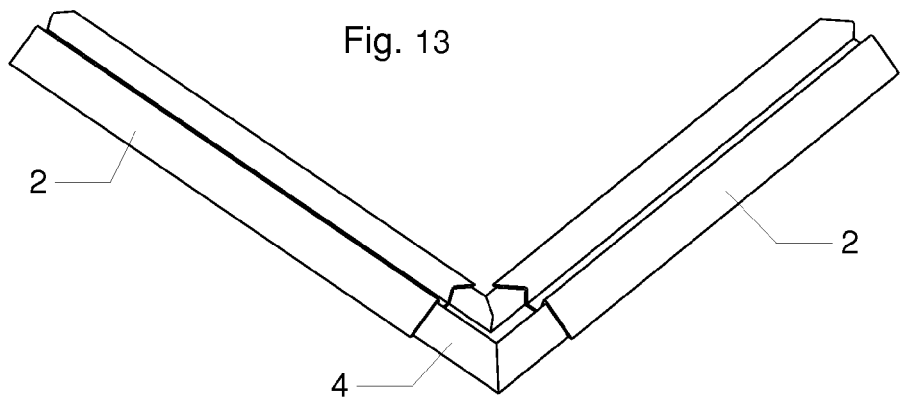
Fig. 13
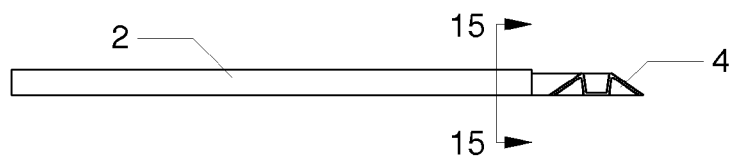
Fig. 14
Fig. 15
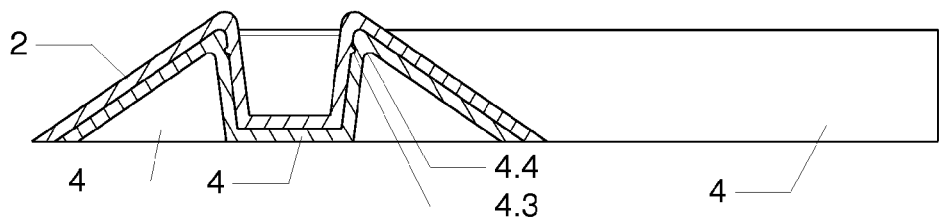

MODULAR BED BUG TRAP SYSTEM

CROSS-REFERENCE TO RELATED APPLICATIONS

This application claims the benefit of Canadian application no. 2783685 filed 2012 Jul. 18.

STATEMENT REGARDING FEDERALLY SPONSORED RESEARCH OR DEVELOPMENT

Not applicable

BACKGROUND OF THE INVENTION

I. Field of the Invention

The present invention relates generally to pest control systems, and more specifically to a modular insect trap, which may be configured to encompass an arbitrary area, thus to prevent an infestation of bed bugs and other crawling arthropods from spreading into or out of this area.

II. Brief Description of the Prior Art

Bed bugs, a parasitic, blood feeding arthropod of the family Cimicidea, have been unwelcome residents of human habitation since time immemorial. The common bed bug, *Cimex lectularius*, has become so well adapted to human dwelling that by the mid-20th century it has established presence in many homes worldwide. In the late 1940's, due to the widespread and increasing use of DDT and vacuum cleaners, the population of beg bugs declined sharply in the western world, and was reduced to near extinction in subsequent years. Following a ban on DDT use in 1972, however, and due to a growing effort since to curb the toxicity and use of insecticides and to the increasing resistance of bed bugs to commercial insecticides which have been in use, there has been a resurgence of bed bug population in recent years. The ever-growing volume of national and international travel and relocation has also contributed to the global proliferation of bed bugs. Not surprisingly, airplanes, cruise ships, hotels, motels, dormitories, barracks, and other short-term lodging facilities are particularly susceptible to bed bug infestation.

Bed bugs are active mostly at night, hiding in tiny cracks and crevices during the day, and are therefore not readily detected. They are capable of withstanding long periods of sub-zero temperatures, and can survive over a year without feeding. As noted above, bed bugs have developed resistance to many commercial insecticides, and those insecticides known to be effective are believed to have a serious adverse effect on human health with prolonged exposure. Bed bugs are not attracted to bait materials used in typical cockroach and ant traps, and are not ensnared by ordinary adhesive-based insect traps. Eradication of bed bugs, once established in a dwelling, has thus proven very difficult.

Attempts to control bed bug infestation approached the problem from three different directions. Traditionally, various natural substances, believed to act as Insect repellents, were employed, but these substances are now generally considered of limited or dubious efficacy, particularly in clearing an already infested area.

More recently, bed bug control strategies focused on insecticides. As mentioned above, many insecticides are no longer effective against bed bugs; others pose a risk to human health. Most insecticides must contact the insect directly to be effective. Due to the secretive nature of bed bugs, however, and their ability to hide in tiny, inaccessible cracks and crevices in the home, it is not always possible to achieve this direct contact.

The third approach to bed bug control has relied on ensnarement of the insects in a trap, which typically comprises a pitfall containing an insecticide, in a powder or liquid form.

Crawling insect traps of the prior art, including bed bug traps, may be broadly categorized into two types: the first type are traps which contain an attractant to lure insects to enter them; the second type are traps which encompass a natural attractant to seclude it from insect access.

One example of a trap of the first type is proposed in patent application US2009/0145020A1 (Susan McKnight; 2009). This trap employs heat, carbon-dioxide, and/or a chemical lure, to attract bed bugs and the like to climb the trap walls and topple over a smooth-walled precipice into an inescapable pit. A significant drawback of all traps of this first type is their localized effect. Insects approaching the natural attractant to be protected from a direction which places them closer to it than to the trap will be affected by it to a greater extent than by the trap and will preferentially proceed to it. In the case of bed bugs, the natural attractant—a person resting on a couch or lying down in a bed—may be sensed over a relatively large area. Effective protection using traps of the first type may only be achieved in this case by the placement of several, closely spaced such traps around the bed or couch area. Increasing the concentration or the dispersal volume of the artificial attractant of traps of this first type does not necessarily broaden their range of effectiveness (an observation noted in patent application US2011072711A1 to Bruce C. Black; 2011), since bed bugs are repelled by highly concentrated attractants or excessive airflow about them.

Crawling insect traps of the aforementioned second type have been devised in two general forms: the first form comprises a platform upon which the object to be isolated is to be placed, which platform is adapted peripherally to repel, immobilize, or destroy inbound insects; the second form (hereafter termed a "peripheral trap") comprises separate, elongated sections, which are deployed—often interconnected—about the object to be isolated, and which pose an impassable barrier to inbound insects.

One example of a trap of the first form is patent DE102006039990A1 (Anmelder Gleich; 2006), teaching an adaptation of a picnic mat to comprise a peripheral recess filled with insecticide powder to keep crawling insects out of the mat's interior area. Another example is U.S. Pat. No. 5,768,821 (James D. Currey; 1998), which teaches the adaptation of a tarp with a raised boundary comprising an adhesive surface, which immobilizes insects attempting to enter the interior tarp area. These two and similar solutions, suitable as they are for isolating a well-defined, relatively small surface area, are impractical for isolating various layouts of furniture in a room. Patent application US20110225873A1 (Suzan McKnight; 2011) proposes a coaster-like platform formed with a circumferential moat, optionally containing an insecticide, which is to be placed under each leg of an article of furniture to intercept crawling arthropods attempting to approach or depart from that article of furniture. Leg-based furniture may be successfully isolated from crawling arthropods with McKnight's device, provided that the article of furniture and any sheeting used with it do not contact adjacent walls or other furniture, and that any bed/sofa spreads or blankets do not contact the floor. In regular, ordinary use, these conditions are difficult to observe. Furniture which is not leg based cannot benefit from this device, of course.

A peripheral trap, the second of the aforementioned forms, that is intended for bed bugs is taught in U.S. Pat. No. 1,005, 567 (William H. McDonald; 1911). This device comprises elongated, open, trough-like sections, which are affixed circumferentially to the ceiling, as a continuous, communicating rectangular frame. Bed bugs attempting to climb the walls and traverse the ceiling to a point where they can drop onto a bed are thus intercepted and are channelled along the frame to a collection reservoir. It is also proposed, in this patent, that smooth bands be applied to the legs of the bed to be protected to prevent bed bugs from climbing them. This device, aside from being difficult to install and, arguably, objectionable aesthetically, offers only a partial solution to the problem of bed bug infestation. It purports to seclude a bed from insect access (albeit leg bands would be of as limited efficacy as other leg-based traps), but it cannot curb the spreading of bed bug population.

A peripheral trap intended for crawling insects is taught in U.S. Pat. No. 7,676,985B1 (Robert T. Perkins; 2010). This device consists of a plurality of elongated sections, each section is slightly offset from its mounting surface to create a gap through which insects enter the trap, and comprises an interior cavity which immobilizes admitted insects by an adhesive coating, or exterminates them with an insecticide powder. An adhesive backing allows the sections to be affixed to a bedframe, or to the floor or ceiling to form a continuous isolating barrier.

Since bed bugs, reportedly, are not ensnared by the adhesive coatings that are ordinarily applied to glue traps, this device could only be effective against bed bugs when mounted inverted (i.e. on the ceiling) and filled with an insecticide. As with the previous example, this would be a difficult, unsightly installation, which does not allow ready monitoring of the infestation status and eradiation progress. Furthermore, unless individual sections are carefully placed in perfect abutment against one another, resulting gaps may allow bed bug passage.

Another peripheral trap intended for crawling insects is taught in patent US20100043275A1 (Antonio W. Battick; 2010). This device comprises an elongated, trough-like strip containing an insect immobilizing adhesive or an insecticide, which is affixed circumferentially about the article to be protected. Mounting this device directly onto a bedframe would be ineffective in secluding bed bugs from it, as sheets and blankets inevitably drape over bedframes and would afford bed bugs ready passage to the bed. As mentioned above, glue traps, generally, are ineffective against bed bugs.

U.S. Pat. No. 5,926,999 (Robert S. Vernon; 1999) discloses a large scale peripheral trap intended for secluding beetles from cultivated fields. This device, as the present invention, comprises a plurality of interconnected sections, each formed as a trough featuring coarse outer ramps leading to a smooth-walled precipice. Though it shares the general concept of the present invention, this device is designed to be implanted in soil and cannot be affixed to a floor, nor can it be set up as a continuous, unbroken boundary about an area of arbitrary geometry.

There remains a need, evidently, for effective means by which bed bug infestation may be prevented from spreading into or out of an area in a dwelling or a workplace, which overcomes the aforementioned shortcomings of existing solutions. The present invention addresses this need.

SUMMARY OF THE INVENTION

It is the principal object of the present invention to provide a simple, inexpensive, reusable trap for capturing and exterminating bed bugs and other domestic crawling arthropods.

A second object of the present invention is to provide a trap as described above, which may be configured to fully delineate, and thus isolate an arbitrary target area in a home, thereby to curb the spreading of bed bug infestation in or out of the target area.

A third object of the present invention is to provide a non-toxic means of eradication of bed bugs and the like.

These objects are met in embodiments of the present invention through several features, as outlined below.

In its principal aspect, the present invention is a simple, but effective implementation of the proven pitfall method of trapping, using inexpensive plastic components.

A second aspect of the present invention is its flexible modular construction. A plurality of linear pitfall trap sections is provided, which may be joined collinearly or at a right angle to one another to form a continuous boundary about a target floor area of any rectilinear geometry.

A third aspect of the present invention is the use of diatomaceous earth—a non-toxic, sedimentary silica rock in granular form—to exterminate trapped insects.

These and other objects and features of the present invention are fully expounded hereinafter in the description of the preferred embodiment, in which references are made to accompanying drawings, described next.

BRIEF DESCRIPTION OF THE SEVERAL VIEWS OF THE DRAWING

FIG. 11 A perspective view of one of the corner connectors of the trap assembly of FIG. 1.

FIG. 12 A detail view corresponding to area 12 of FIG. 11, showing the groove in one of the side walls of the corner connector.

FIG. 13 A perspective view of two linear segments linked via a corner connector.

FIG. 14 An orthogonal side view of the assembly of FIG. 13 with the left segment removed.

FIG. 15 A sectional view corresponding to line 15 of FIG. 14, showing the interface between the linear segment and corner connector.

DETAILED DESCRIPTION OF THE INVENTION

Figure 1:
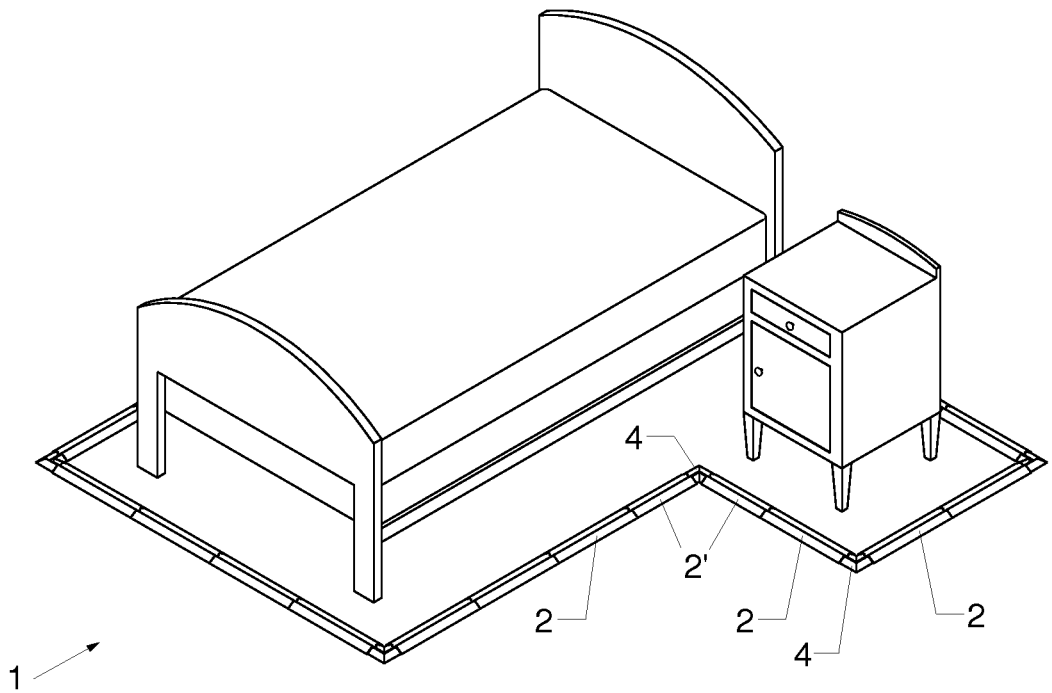
FIG. 1 A perspective view of an exemplary bedroom setup of a bed bug trap according to the present invention.

An exemplary setup of a preferred embodiment of the bed bug trap system according to the present invention is shown in FIG. 1, denoted generally by the numeral 1 (although references to bed bugs are made throughout this description—bed bugs being the principle target of the present trap system—it is to be understood that the system is equally suitable for trapping other crawling arthropods). The constituent components of this embodiment are termed in this description and in the appended claims (and denoted numerically) as follows: linear segment (2), ancillary segment (2'), linear connector (3), and corner connector (4). Diatomaceous earth is used as mechanical insecticide.

Figure 2:
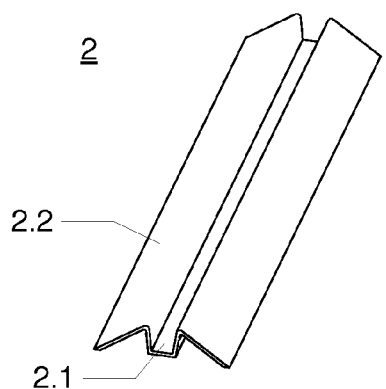
FIG. 2 A perspective view of one of the linear segments of the trap assembly depicted in FIG. 1.
Figure 3:
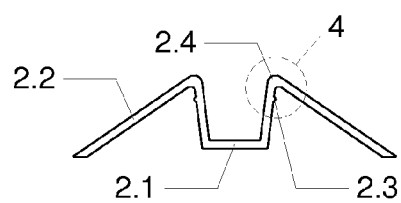
FIG. 3 An orthogonal side view of the linear segment depicted in FIG. 2.
Figure 4:
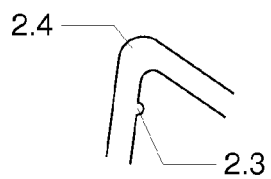
FIG. 4 A detail view corresponding to area 4 of FIG. 3, showing the ridge that is formed in each side wall of each linear segment.
Figure 5:
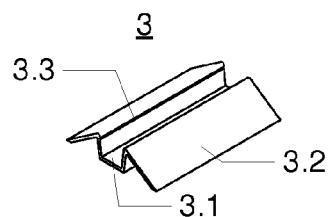
FIG. 5 A perspective view of one of the linear connectors of the trap depicted in FIG. 1.
Figure 6:
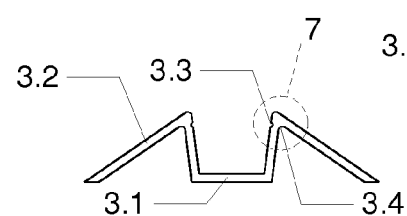
FIG. 6 An orthogonal side view of the linear connector depicted in FIG. 5.
Figure 7:
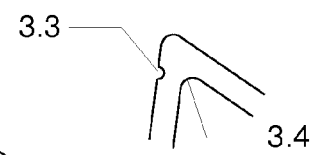
FIG. 7 A detail view corresponding to area 7 of FIG. 6, showing the groove that is formed in each side wall of each linear connector.
Figure 8:
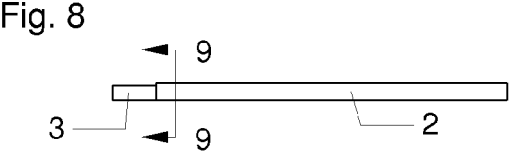
FIG. 8 An orthogonal side view of a linear segment coupled to a linear connector.

Linear segment 2, shown in FIG. 2-4, constitutes a discrete pitfall module of the system. Several units of linear segment 2 are linked contiguously, as described in following paragraphs, to form the complete system. Linear segment 2 comprises a trough-like channel, denoted 2.1, which is substantially U-shaped in cross section, and inclined flanges, 2.2, which extend one from each side wall of channel 2.1.

Channel 2.1, in the preferred embodiment, is formed with its side walls inclined outwardly, a feature which facilitates compact stacking of several units of linear segment 2 for packaging. Each side wall of channel 2.1 is formed on its outer side, at an upper part thereof, with a ridge, 2.3, best seen in the detail view of FIG. 4. Ridges 2.3 span the entire length of segment 2 in the preferred embodiment, but alternatively may extend only partly from its ends. When segment 2 is coupled to linear connector 3 or corner connector 4, as will be described in following paragraphs, ridges 2.3 engage corresponding grooves in the side walls of the coupled connector. Linear segment 2 is formed of thermoplastic material in the preferred embodiment (as are the other components), and possesses sufficient surface smoothness to preclude bed bugs that topple into channel 2.1 from ascending its side walls. Channel 2.1 thus serves as an effective pitfall.

Flanges 2.2 are set to a relatively obtuse inclination angle of about 35° with respect to the floor, serving as attractive and readily climbable ramps leading to the pitfall (the term "floor" is used broadly in this description and in the appended claims to refer to any surface on which trap system 1 rests). Preferably, but optionally, flanges 2.2 are formed or adapted with bevelled ends, angled to lie flat on the floor. This facilitates the transition of bed bugs from the floor to flanges 2.2. The inclination angle of flanges 2.2 (and the bevel angle of their ends) may differ widely from the aforesaid value, with no significant change to the efficacy of the trap. Flanges 2.2 connect to the side walls of channel 2.1 by well-rounded shoulders, 2.4, to prevent bed bugs from balking at the presence of a sharp surface edge and to entice them to continue towards the pitfall. As best seen in FIG. 3, flanges 2.2 extend below channel 2.1 to accommodate the connectors which underlie it, as described hereafter. To attract and enable bed bugs to climb flanges 2.2, their upper surface is roughened to an average surface irregularity of about 3 micrometer. This adaptation is best achieved by, but not limited to, any of the following techniques commonly used in surface preparation for bonding: grit blasting, manual abrasion (e.g. sanding or wire-brushing), or chemical or laser etching. Alternatively, a strip of coarse material, such as uncoated paper or cloth, may be bonded to the surface. Flanges 2.2 must be so adapted over their entire upper surface to at least the apex line on shoulder 2.4. In the preferred embodiment, this adaptation extends a few millimeters beyond the apex line to encourage bed bugs to proceed onto the downslope side of shoulder 2.4.

Ancillary segment 2' is identical in cross section to linear segment 2, and comprises the same elements (denoted identically), but is shorter in length. The difference in length between ancillary segment 2' and linear segment 2 corresponds to certain dimensions of corner connectors 4, as will be fully discussed in following paragraphs. Ancillary segment 2' is coupled to each corner connector 4 that defines a concave corner of the trap assembly, and ensures that the remaining components of the assembly are aligned rectilinearly. The relationship of ancillary segments 2' to the other components of the trap assembly is seen clearly in the basic setup depicted in FIG. 16, and discussed further hereafter.

Linear connector 3, shown in FIG. 5-10, links two units of linear segment 2 or a unit of linear segment 2 to a unit of ancillary segment 2' collinearly. Linear connector 3 substantially mirrors in cross section linear section 2, comprising a U-shaped channel, 3.1, and inclined flanges, 3.2, which extend one from each side wall of channel 3.1.

Channel 3.1, in the preferred embodiment, is formed with its side walls set at the same or a somewhat smaller divergence angle than the divergence angle of the side walls of channel 2.1 of linear segment 2 (and of ancillary segment 2'), and is dimensioned to tightly fit about channels 2.1 of the two segments coupled to it. Each side wall of channel 3.1 is formed with a groove, 3.3, in its inner face, best seen in the detail view of FIG. 7. Grooves 3.3 are advantageously formed above the level of the shoulder bend, denoted 3.4, in the respective side wall, where the wall thickness is greater. Grooves 3.3 span the length of linear connector 3 and are dimensioned in cross section to closely fit ridges 2.3 of linear segment 2 (and ancillary segment 2'). When linear connector 3 is coupled to linear segment 2 or to ancillary segment 2', grooves 3.3 engage and resiliently clamp onto ridges 2.3, and thereby secure the connection. Linear connector 3, when linked to linear segment 2, is seen clearly in the sectional view of FIG. 9.

Flanges 3.2 are formed at such an angle that they lie flat against the underside of flanges 2.2, when linear connector 3 is coupled to linear segment 2 or to ancillary segment 2'. In the preferred embodiment, flanges 3.2 extend to the floor, their ends bevelled to lie flat upon it. As will be apparent to the skilled technician, the bevelling of the ends of flanges 3.2 is entirely optional, and flanges 3.2 may extend only partly along the undersides of flanges 2.2 or be absent altogether.

Figure 10:
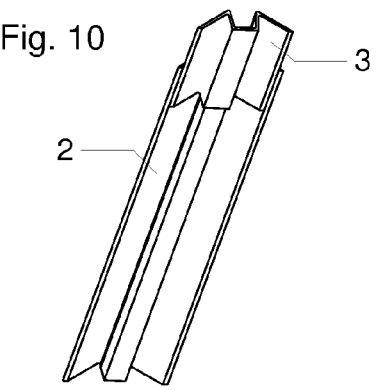
FIG. 10 A perspective view of a linear segment coupled to a linear connector.
Figure 9:
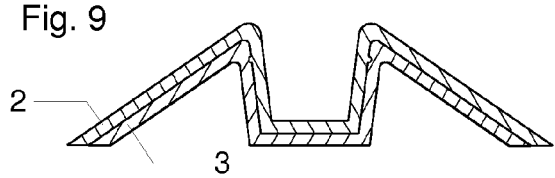
FIG. 9 A sectional view corresponding to line 9 of FIG. 8, showing the interface between the linear segment and linear connector.

Linear connector 3 is to be coupled to linear segment 2 or ancillary segment 2' so that approximately half of its length extends over the segment, as seen in FIG. 10. Alternative embodiments may graphically or physically demarcate the mid-length position on connector 3 to facilitate proper seating of linked segments within connector 3, or emboss a short perpendicular flange in this position, as a structural guide interposed therebetween.

In an alternative embodiment, linear connector 3 comprises a solid mid-length section, while each of its outer sections is formed as a double walled socket, capable of admitting an end section of a linear or ancillary segment and retain it frictionally therewithin.

Corner connector 4, shown in FIG. 11-15, links two units of linear segment 2, or of ancillary segment 2', or a unit of linear segment 2 to a unit of ancillary segment 2', at a right angle to one another. Corner connector 4 comprises a channel, 4.1, which is L-shaped in layout and substantially U-shaped in cross section, and inclined flanges, 4.2, which extend one from each side wall of each leg of channel 4.1.

Channel 4.1, in the preferred embodiment, is formed with the side walls of each of its legs set to the same divergence angle as that of the side walls of channel 2.1 of linear segment 2 (and of ancillary segment 2'), and optionally, to a gradually decreasing divergence angle towards the extremity of each leg. Channel 4.1 is dimensioned to fit tightly about channels 2.1 of the two segments coupled to it. Each side wall of channel 4.1 is formed with a groove, 4.3, in its inner face, best seen in the detail view of FIG. 12. Grooves 4.3 are dimensioned in cross section to closely fit ridges 2.3 of linear segment 2 (and ancillary segment 2'). When corner connector 4 is coupled to linear segment 2 or to ancillary segment 2', grooves 4.3 engage and resiliently clamp onto ridges 2.3, thus securing the connection. Grooves 4.3 are advantageously formed above the level of the shoulder bend in the respective side wall, denoted 4.4 in FIGS. 12 and 15, where the wall thickness is greater, and extend only part-way along each leg of channel 4.1, thereby to limit how far a well-seated linear segment 2 or ancillary segment 2' may be emplaced therein. When so positioned, two linked segments are set apart a fixed, predetermined distance, and their flanges 2.2 do not overlap, as seen in FIG. 13. The interface between corner connector 4 and linear segment 2 (or ancillary segment 2') is best seen in the sectional view of FIG. 15, which depicts the arrangement seen in FIG. 13 with the left segment removed.

Flanges 4.2 of each leg of corner connector 4 are formed at such an angle that they lie flat against the underside of flanges 2.2 when corner connector 4 is coupled to linear segment 2 or to ancillary segment 2', the two inner and two outer flanges joined to form a continuous surface, and extend to the floor, their ends preferably, but optionally bevelled to lie flat upon it.

Figure 16:
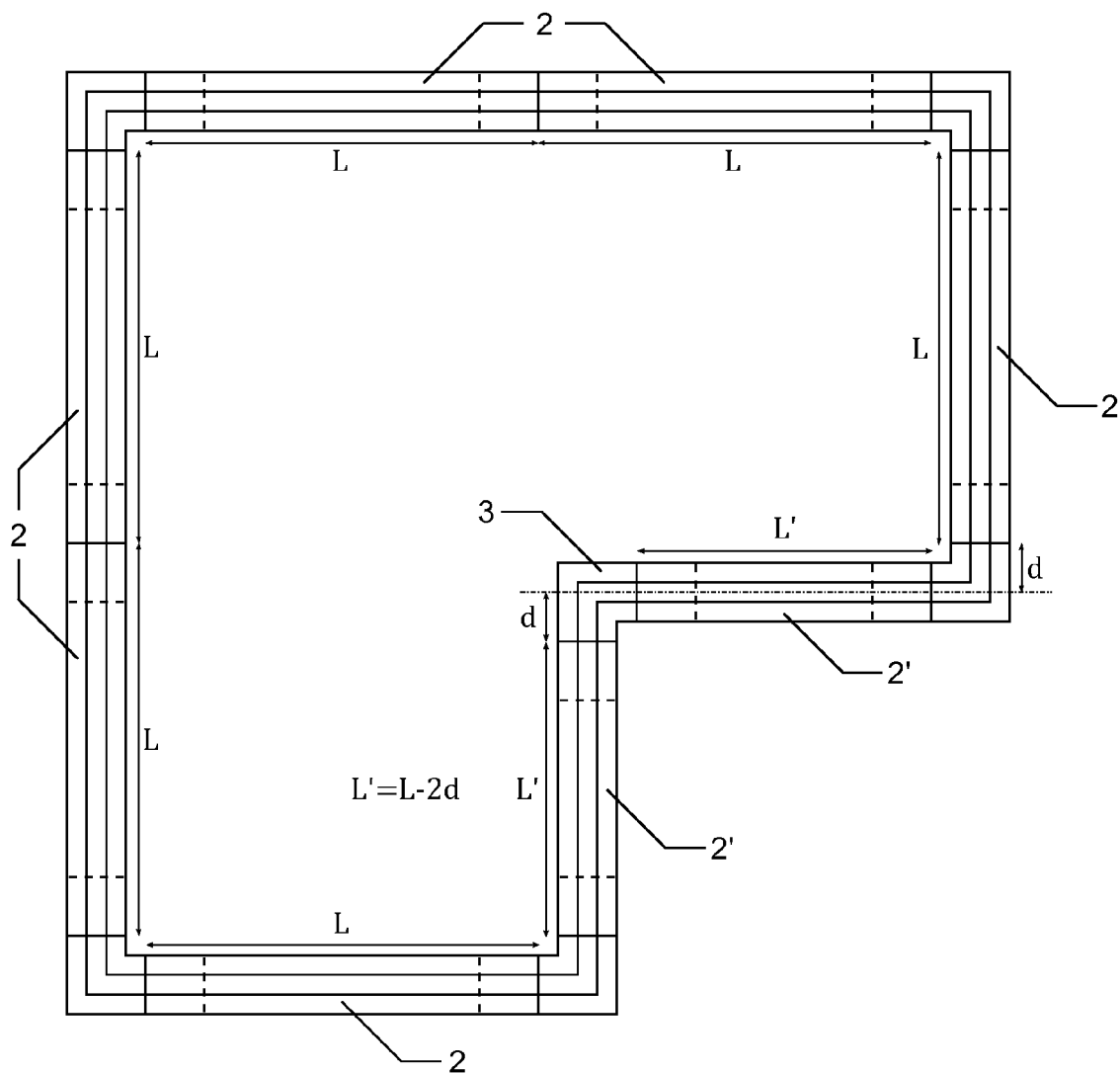
FIG. 16 A schematic layout of an exemplary, basic setup of the trap system of the present invention, depicting the relationship between concave corner segment length and corner connector dimensions.

Corner connector 4, as described above, imposes a certain longitudinal displacement on coupled segments. This displacement, denoted "d" in FIG. 16, is inconsequential in symmetrical configurations; in asymmetrical configurations, however, it corrupts rectilinear alignment and must be counterpoised. This is done, in the preferred embodiment, by coupling all corner connectors in concave corners of the trap to ancillary segments 2'. Ancillary segment 2', as described above, is identical in cross section to linear segment 2, but is shortened by twice the distance, denoted "d" in FIG. 16, between the inner end of groove 4.3 of one leg (which defines the position where segment 2' is seated) and the centre line of channel 4.1 of the other leg.

In an alternative embodiment, ancillary segments 2' are shortened by the distance d (not twice d), but are coupled to every corner connector (i.e. on convex as well as concave corners). In another alternative embodiment, ancillary segments 2' are lengthened by a distance equivalent to twice the distance d, and are disposed in trap legs which are parallel to and opposite each corner-displaced segment that is not balanced by an opposite corner-displaced segment. In yet another embodiment, linear connectors 3 may be made sufficiently long to allow one or more pairs of linear segments 2, on trap legs parallel to and opposite each corner-displaced segment that is not balanced by an opposite corner-displaced segment, to be spaced apart as needed to counterbalance the aforesaid displacement, and restore rectilinear alignment.

In the preferred embodiment, channel 2.1 of linear segments 2 and ancillary segments 2', and channel 4.1 of corner connectors 4 contain a shallow layer, a few millimeters thick, of diatomaceous earth—a sedimentary silica rock in a fine powder form, which has proven an effective, non-toxic mechanical insecticide. In alternative embodiments, other non-toxic, granular substances with insecticidal properties, such as talcum powder or even flour, may be employed, or any one of the large variety of commercially available powdered insecticides that is effective against bed bugs (or the targeted insect).

In an alternative embodiment of trap 1, connectors 3 and 4 are dimensioned to be fitted internally, within channels 2.1 of linear segments 2 (and ancillary segments 2'), their flanges 3.2 and 4.2 overlie flanges 2.2. In this configuration, ridges 2.3 are disposed on the inner side of channel 2.1, and grooves 3.3 and 4.3 are disposed on the outer side of channels 3.1 and 4.1.

Linear connector 3, in this embodiment, may optionally consist of channel 3.1 only, with no flanges extending from its side walls. If formed with inwardly inclined side walls, channels 2.1, 3.1 and 4.1 need not be adapted with ridges 2.3 and grooves 3.3 and 4.3, and proper segment positioning with respect to corner connector 4 may be implemented as above.

In a second alternative embodiment of trap 1, linear segments 2 and ancillary segments 2' are formed with their channel side walls inclined inwardly. Linear connectors 3 and corner connectors 4 are formed with similarly convergent side walls, of the same or a somewhat greater convergence angle, to provide resilient clamping of channels 2.1 emplaced therein. In this embodiment, segment-connector coupling is fortified by the convergent geometry, obviating the need for ridges 2.3 and grooves 3.3 and 4.3. Correct segment positioning with respect to corner connector 4 may be facilitated, in this embodiment, by a shallow boss or flange extending from channel 4.3, which limits the extent of overlap between corner connector 4 and the coupled segment.

Some or all of linear segments 2 and ancillary segments 2' may be affixed to the floor with lengths of adhesive tape (e.g. masking tape) to prevent accidental displacement or detachment, and to minimize the possibility of passage of bed bugs underneath the trap. Alternatively, strips of peel-off pressure-sensitive adhesive may be applied to the bottom of channel 4.1 of corner connector 4, thereby to affix it to the floor. In embodiments where segments 2 and 2' underlie connectors 3 and 4, adhesive strips may be applied to the bottom of channels 2.1.

An alternative to the preferred extruded and molded thermoplastic material for the constituent parts of trap system 1 is sheet metal. In sheet metal implementations, ridges 2.3 of linear segments 2 and ancillary segment 2', and grooves 3.3 and 4.3 of linear connectors 3 and corner connectors 4 are each formed as a small radius undulation in the respective side wall, rather than a surface protrusion or indentation.

It is to be understood that the forgoing description of the preferred and alternative embodiments of the present invention, and the accompanying drawings are intended to better elucidate the invention by way of examples, and not in any way to narrow its purview or the scope of the appended claims to the embodiments exemplified.

The invention claimed is:

1. A modular insect trap system for bed bugs and other crawling arthropods, comprising:
    (a) a plurality of linear segments each segment comprising an elongated, substantially U-shaped, open-ended, smooth-walled linear segment channel, said linear segment channel having divergently inclined sidewalls, each sidewall being extended outwardly and each sidewall including a downwardly inclined linear segment flange protruding from each sidewall, each linear segment flange rests on a surface supporting said linear segment channel when said trap is deployed, each of said linear segment flanges having a roughened upper surface that is susceptible of traversal by bed bugs, and each linear segment having a first linear segment end and a second linear segment end;
    (b) a plurality of ancillary segments, each ancillary segment comprising an elongated, substantially U-shaped, open-ended, smooth-walled ancillary segment channel, said ancillary segment channel having divergently inclined sidewalls, each sidewall being extended outwardly and each sidewall including a downwardly inclined linear segment flange protruding from each sidewall, each ancillary segment flange rests on a surface supporting said ancillary segment channel when said trap is deployed, each of said ancillary segment flanges having a roughened upper surface that is susceptible of traversal by bed bugs, and each ancillary segment having a first ancillary segment end and a second ancillary segment end; wherein each ancillary segment is identically dimensioned to said linear segments as measured from a cross section of said ancillary and said linear segments, each ancillary segment having a length to allow compensation for any longitudinal displacement of said linear or ancillary segments when connected angularly, whereby rectilinear alignment of said trap when laid out asymmetrically may be maintained;

(c) a plurality of linear connectors, each connector comprising an elongated, substantially U-shaped, open-ended linear connector channel, said linear connector channel having divergently inclined sidewalls, and each sidewall including a downwardly inclined linear connector flange protruding from each sidewall, said linear connector dimensioned such that the linear connector is can be tightly fitted by a first linear connector end section on one side thereof onto one of the first and second linear segment ends and the first and second ancillary segment ends, and by a second linear connector end section on the other side thereof onto one of the first and second linear segment ends and the first and second ancillary segment ends, thereby each linear connector is configured to join one of said linear segments and one of said ancillary segments collinearly;

(d) a plurality of corner connectors, each corner connector having an open ended channel, L-shaped in layout defining a first leg and a second leg, and substantially U-shaped in cross section corner connector channel, said corner connector channel having divergently inclined sidewalls, each sidewall being extended outwardly with a downwardly inclined corner connector flange, the two connector flanges extending from the longer, outer sidewalls, and the two connector flanges extending from the shorter, inner sidewalls defining an unbroken surface, and resting on a surface supporting said channel when said trap is deployed, said corner connector dimensioned such that the corner connector can be tightly fitted by a first corner connector end section formed at the end of said first leg onto one of the first and second linear segment ends and the first and second ancillary segment ends, and by a second corner connector end section formed at the end of said second leg onto one of the first and second linear segment ends and the first and second ancillary segment ends, thereby each corner connector is configured to join one of said linear segments and one of said ancillary segments at a right angle to one another;

(e) a layer of granular insecticide, disposed within exposed surfaces of the channel sections of said linear and ancillary segments, and linear and corner connectors, when fully assembled and deployed, thereby to exterminate trapped insects.

2. An insect trap system as defined in claim 1, wherein said linear and corner connectors are fitted onto said linear and ancillary segments, so that said connector channels envelop said segment channels, and said connector flanges underlie said segment flanges, and wherein said segment flanges extend below said segment channels to meet the surface supporting said channel when said trap is deployed.

3. An insect trap as defined in claim 2, wherein said linear and ancillary segment channels are formed with a longitudinal ridge protruding from each sidewall outwardly, respecting said channel, and wherein said linear and corner connector channels are formed with a longitudinal groove in each sidewall facing inwardly, respecting said channel, said ridges resiliently engaging said grooves upon segment-connector coupling.

4. An insect trap as defined in claim 3, wherein said grooves of said corner connector extend from the outer end of each leg thereof inwardly to an inner end to such a length that said linear or ancillary segments, when coupled to the corner connector with said ridges thereof fully engaged with said grooves along an entire groove length, are sufficiently spaced apart that said inclined flanges thereof do not overlap.

5. An insect trap as defined in claim 4, wherein said ancillary segments differ in length from said linear segments by twice the distance between the inner end of said grooves of said corner connector on one leg thereof and the longitudinal plane of symmetry of the other leg thereof, and are linked to all of said corner connectors which define concave corners of the assembled trap, thereby to maintain rectilinear alignment when said trap is laid out asymmetrically.

6. An insect trap system as defined in claim 1, wherein said linear and corner connectors are fitted to said linear and ancillary segments, so that said connector channels are lodged within said segment channels, and said connector flanges overlie said segment flanges.

7. An insect trap as defined in claim 6, wherein said linear and ancillary segment channels are formed with a longitudinal ridge protruding from each sidewall inwardly, respecting said channel, and wherein said linear and corner connector channels are formed with a longitudinal groove in each sidewall outwardly, respecting said channel, said ridges resiliently engaging said grooves upon segment-connector coupling.

8. An insect trap as defined in claim 7, wherein said grooves of said corner connector extend from the outer end of each leg thereof inwardly to an inner end to such a length that said linear or ancillary segments, when coupled to the corner connector with said ridges thereof fully engaged with said grooves along an entire groove length, are sufficiently spaced apart that said inclined flanges thereof do not overlap.

9. An insect trap as defined in claim 8, wherein said ancillary segments differ in length from said linear segments by twice the distance between the inner end of said grooves of said corner connector on one leg thereof and the longitudinal plane of symmetry of the other leg thereof, and are linked to all of said corner connectors which define concave corners of the assembled trap, thereby to maintain rectilinear alignment when said trap is laid out asymmetrically.

* * * * *